US 8,305,577 B2

(12) United States Patent (10) Patent No.: US 8,305,577 B2
Kivioja et al. (45) Date of Patent: Nov. 6, 2012

(54) METHOD AND APPARATUS FOR SPECTROMETRY

(75) Inventors: Jani Kivioja, Cambridge (GB); Piers Andrew, Cambridge (GB); Chris Bower, Cambs (GB); Zoran Radivojevic, Cambridge (GB)

(73) Assignee: Nokia Corporation, Espoo (FI)

( * ) Notice: Subject to any disclaimer, the term of this patent is extended or adjusted under 35 U.S.C. 154(b) by 93 days.

(21) Appl. No.: 12/939,987

(22) Filed: Nov. 4, 2010

(65) Prior Publication Data

US 2012/0113422 A1 May 10, 2012

(51) Int. Cl.
*G01J 3/28* (2006.01)
(52) U.S. Cl. ...................................................... 356/328
(58) Field of Classification Search .................. 356/328, 356/326
See application file for complete search history.

(56) References Cited

U.S. PATENT DOCUMENTS

| | | | |
|---|---|---|---|
| 5,446,534 A | 8/1995 | Goldman | |
| 5,615,008 A | 3/1997 | Stachelek | |
| 6,289,144 B1 * | 9/2001 | Neuschafer et al. | 385/12 |
| 7,894,693 B2 * | 2/2011 | Fujii | 385/37 |
| 2004/0248318 A1 * | 12/2004 | Weinberger et al. | 436/173 |
| 2005/0147342 A1 | 7/2005 | Uchiyama | |
| 2006/0279732 A1 | 12/2006 | Wang | |
| 2006/0292039 A1 | 12/2006 | Iida | |
| 2009/0295910 A1 | 12/2009 | Mir | |

FOREIGN PATENT DOCUMENTS

| | | |
|---|---|---|
| WO | 03/100469 A2 | 12/2003 |
| WO | 2009/070459 A1 | 6/2009 |

OTHER PUBLICATIONS

Rowe, C.J. et al. High reflectivity surface-relief gratings in single-mode optical fibers. IEEE Proceedings, Part J, Optoelectronics. 1987, vol. 134, pp. 192-202.
Notification of Transmittal of the International Search Report and The Written Opinion of the International Searching Authority in PCT Application PCT/FI2011/050803, dated Nov. 16, 2011.
Written Opinion of the International Searching Authority in PCT Application PCT/FI2011/050803, dated Nov. 16, 2011.
International Search Report in PCT Application PCT/FI2011/050803, dated Nov. 16, 2011.
Schneier, Bruce; *Applied Cryptography*; 2nd ed. 1996 (15 pages).

* cited by examiner

*Primary Examiner* — Tarifur Chowdhury
*Assistant Examiner* — Abdullahi Nur
(74) *Attorney, Agent, or Firm* — Harrington & Smith

(57) ABSTRACT

In accordance with an example embodiment of the present invention, apparatus comprising a waveguide and a spectral dispersion element, the apparatus being configured to be moveably attachable to a portable device, the portable device comprising a radiation sensing element and a radiation source, the apparatus being configured to be moveably attachable to the portable device to provide a first configuration in which the waveguide is positioned to transmit radiation from the radiation source towards an analyte region and/or from the analyte region towards the dispersion element; and such that the dispersion element is positioned to disperse radiation from the analyte region to form a spectrum which is provided towards the radiation sensing element for spectral analysis, and a second configuration in which the radiation sensing element and radiation source are able to capture and illuminate a scene for image capture.

12 Claims, 6 Drawing Sheets

METHOD AND APPARATUS FOR SPECTROMETRY

TECHNICAL FIELD

The present application relates generally to spectrometry.

BACKGROUND

A spectrometer is typically used to assist in identification of analytes such as chemicals, medical samples, food samples, or biological samples. A spectrometer typically uses a radiation source to illuminate an analyte such that the radiation from the radiation source is then reflected from, or transmitted by, the analyte. The transmitted or reflected radiation can then be diffracted by a diffraction grating to yield a spectrum which is characteristic of the analyte. The charactersitc spectrum may then be detected by a detector to discern one or more characteristic properties of the analyte.

SUMMARY

Various aspects of examples of the invention are set out in the claims.

According to a first aspect of the present invention, an apparatus comprising a waveguide and a spectral dispersion element, the apparatus being configured to be moveably attachable to a portable device, the portable device comprising a radiation sensing element and a radiation source, the apparatus being configured to be moveably attachable to the portable device to provide a first configuration in which the waveguide is positioned to transmit radiation from the radiation source towards an analyte region and/or from the analyte region towards the dispersion element; and such that the dispersion element is positioned to disperse radiation from the analyte region to form a spectrum which is provided towards the radiation sensing element for spectral analysis, and a second configuration in which the radiation sensing element and radiation source are able to capture and illuminate a scene for image capture.

According to a second aspect of the present invention, a method comprising:
(i) providing a first configuration in which an apparatus, comprising a waveguide and a spectral dispersion element, is attached to a portable device, which comprises a radiation source and a radiation sensing element; such that the waveguide is positioned to transmit radiation from the radiation source towards an analyte region and/or from the analyte region towards the dispersion element; and such that the dispersion element is positioned to disperse radiation from the analyte region to form a spectrum which is provided towards the radiation sensing element for spectral analysis;
(ii) transmitting radiation from the radiation source to the dispersion element via the analyte region to provide a spectrum for spectral analysis; and
(iii) using the radiation sensing element to detect at least part of the spectrum.

BRIEF DESCRIPTION OF THE DRAWINGS

For a more complete understanding of example embodiments of the present invention, reference is now made to the following descriptions taken in connection with the accompanying, drawings in which.

DETAILED DESCRIPTION OF THE DRAWINGS

Various example embodiments of an apparatus according to the present disclosure will now be described by referring to FIGS. 1 through 3 of the drawings.

Figure 1A:
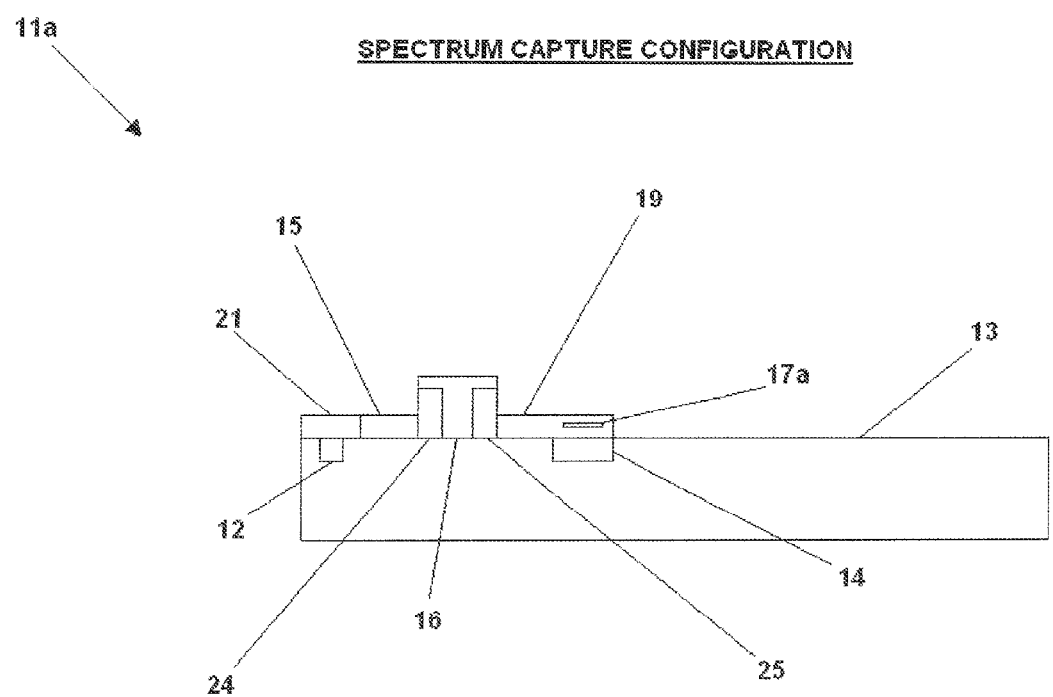
FIG. 1a schematically illustrates an apparatus according to one aspect of the invention.
Figure 2A:
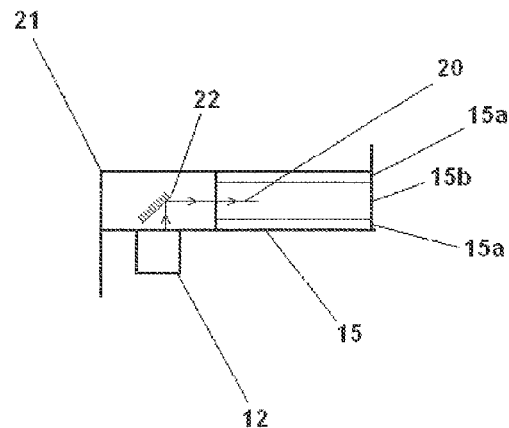
FIG. 2a schematically illustrates a component of apparatus according to one aspect of the invention.

An apparatus such as a portable communication device (e.g. the so-called mobile phone, or Personal Digital Assistant (PDA)) typically comprises an antenna and associated hardware/software, to allow for communication. Increasingly, such devices comprise camera functionality. In FIG. 1a. there is schematically illustrated an apparatus 11a which is a portable communications device with camera functionality. The camera functionality provides for (e.g. digitial) capture of an image of a scene by way of a (e.g. digital) camera 14. As the camera captures light radiation, it can be considered to be a radiation sensing element 14. The apparatus 11a also comprises a flash 12 to allow for illumination of the scene, if required. As the flash 12 provides for illumination by using light radiation, it can be considered to be a radiation source 12.

Figure 1B:
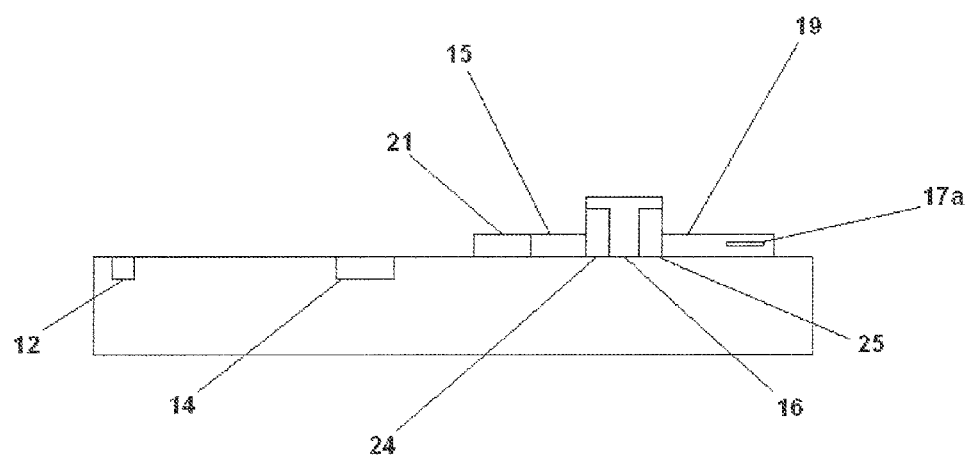
FIG. 1b schematically illustrates an apparatus according to one aspect of the invention.
Figure 1C:
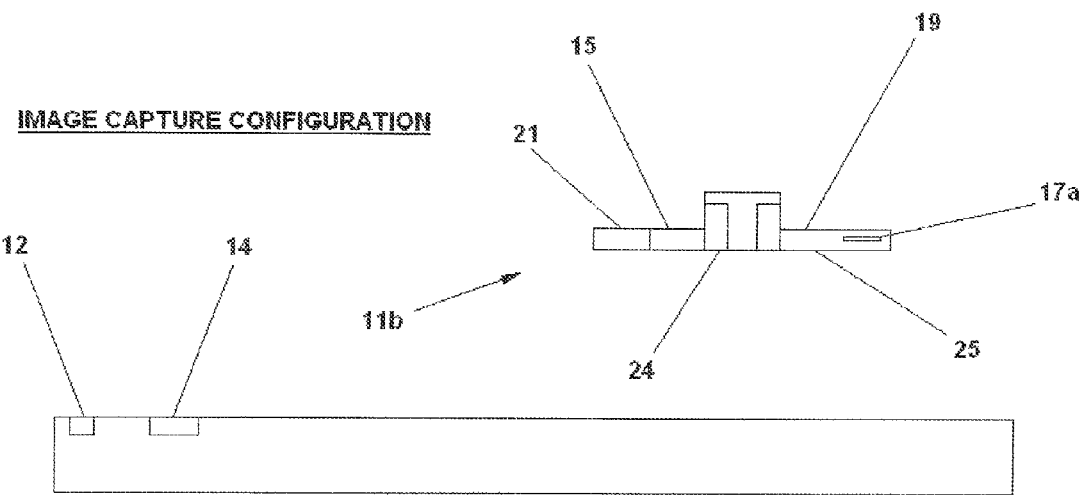
FIG. 1c schematically illustrates an apparatus according to one aspect of the invention.

In addition, the apparatus 11 a comprises a spectometry module 11b (FIG. 1c). The module comprises a first waveguide 15, a second waveguide 19, an analyte region 16, and a spectral dispersion element comprising a first diffraction grating 17a. The spectrometry module is attached to be part of the apparatus 11a such that it can be (e.g. slidably) moved between at least two positions to provide for at least two apparatus configurations. In a first configuration (FIG. 1a), the apparatus 11a is configured for spectrometry, and in a second configuration (FIG. 1b), the apparatus 11a is configured to be able to perform regular camera functionality (i.e. capture of a photo of a scene). The spectrometry module 11b is moved between the two configurations to make use of/reveal the camera/flash according to the particular configuration in question. In certain embodiments, the module 11b can be considered to be moveably attached to the apparatus, such that the module 11b is able to slide across the surface of the apparatus between the first and second configurations.

In a first configuration of the apparatus 11a, the first waveguide 15 is positioned to transmit radiation 20 from the radiation source 12 towards an analyte region 16. Furthermore, the first diffraction grating 17a is positioned to diffract radiation 20 from the analyte region 16, towards the camera 14. The camera 14 can then receive the diffracted radiation (spectrum) from any analyte placed in the analyte region 16. The received spectrum can then be recorded by the camera for use in spectral analysis. It will be appreciated that the diffracted radiation forms a spectrum, one wavelength being diffracted at an angle that differs from that of another.

As previously mentioned, FIG. 1a schematically illustrates the first, spectrum capture, configuration wherein the first diffraction grating 17a is positioned proximate to the camera 14. FIG. 1b schematically illustrates a second, image capture, configuration, wherein the the first diffraction grating 17a is positioned away from the camera 14. In the second configuration, the diffraction grating 17a, is optically removed and/or separate from the camera, which thus allows the apparatus 11a to be used to capture an image of an object/scene that is distant from the apparatus 11a, and not associated with the analyte region 16. In the first configuration, the apparatus 11a is used to capture a spectrum of an analyte that has been placed in or on the analyte region 16.

The apparatus 11a/module 11b may be configured such that the module can be completely removed from the apparatus 11a to provide the second, image capture configuration, and then subsequently reattached to provide for the first, spectrum capture configuration. An example is shown schematically in FIG. 1c, when in the second configuration, the apparatus, comprising the attachable module 11b, need not be in contact with it; the module 11b comprises the first waveguide 15, second waveguide 19, and first diffraction grating 17a. In such embodiments, the module/apparatus would have complementary mating members (e.g. pins/guide recesses (not shown) which allow for such removal).

In a further embodiment (see FIG. 2a), the apparatus 11a/module 11b comprises a radiation reflector 21 (e.g. mirror) configured to reflect radiation 20 from the radiation source 12 towards the first waveguide 15.

Figure 2B:
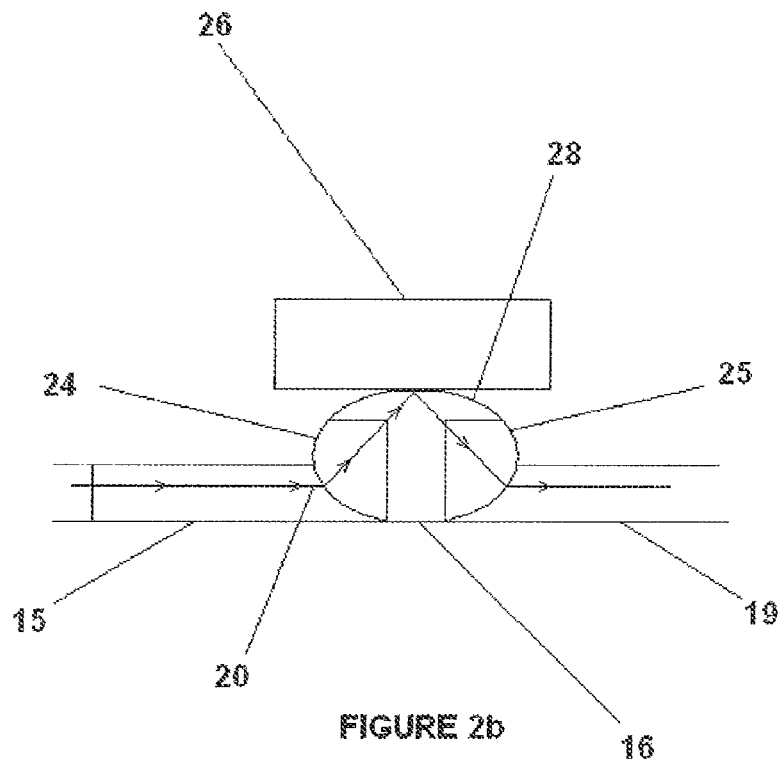
FIG. 2b schematically illustrates a component of apparatus according to one aspect of the invention.
Figure 3:
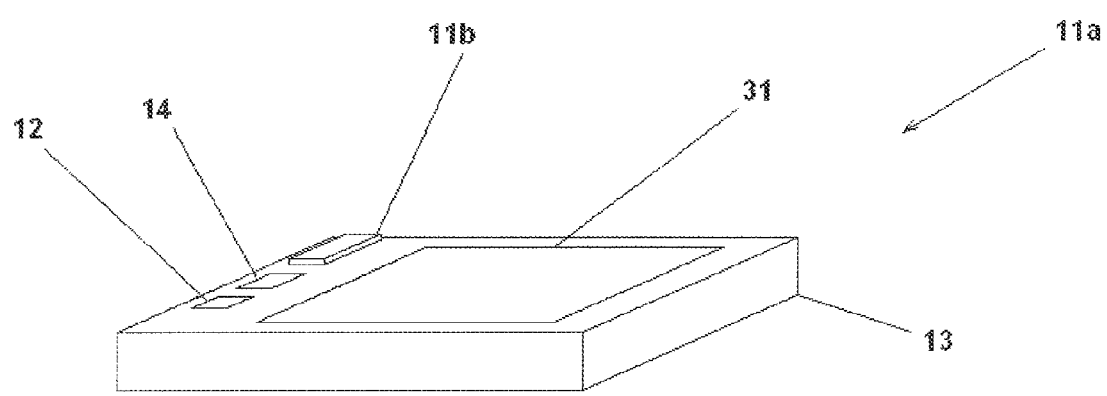
FIG. 3 schematically illustrates an apparatus according to one aspect of the invention.

The apparatus 11a comprises a pre-analyte interface 24, schematically illustrated in FIG. 2b, configured to deflect radiation 20 from the first waveguide 15 towards the analyte 26. In the same, or different embodiment, the apparatus 11a may comprise a post-analyte radiation interface 25 configured to deflect radiation from the analyte 26 towards the second waveguide 19. In such embodiments, the second waveguide 19 is configured to transmit radiation 20 from the analyte region 16 toward the first grating 17a. The post- and pre-analyte interfaces 24, 25 may each be formed from different parts of a convex single lens 28 configured to deflect radiation 20 from the first waveguide 15 towards the analyte 26, and configured to deflect radiation from the analyte 26 towards the second waveguide 19.

Figure 2C:
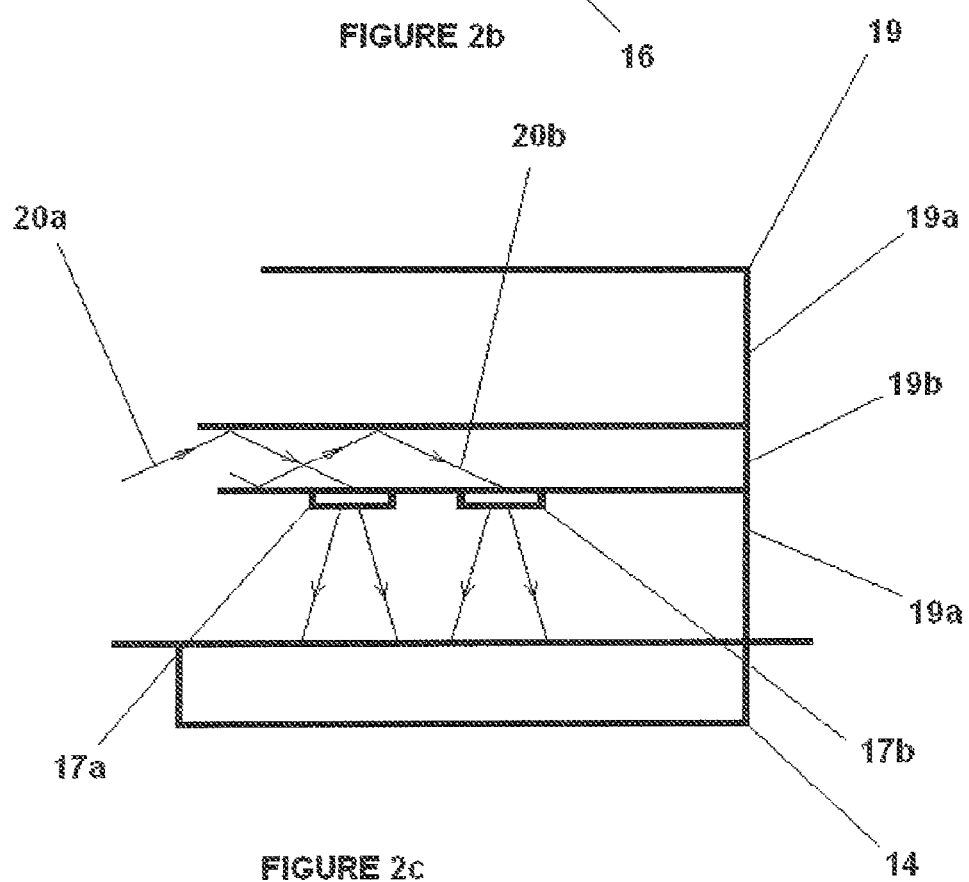
FIG. 2c schematically illustrates a component of apparatus according to one aspect of the invention.

In a further embodiment, the apparatus 11a comprises a second diffraction grating 17b, schematically illustrated in FIG. 2c, configured to diffract radiation having a second wavelength 20b towards the camera 14, and the first grating 17a configured to diffract radiation having a first wavelength 20a towards the camera 14. The second waveguide 19 may be configured such, that the first grating 17a is formed in the second waveguide 19. The second waveguide 19 may be configured such that the first 17a and second 17b gratings are formed in the second waveguide 19.

With reference to FIG. 2a, the first and second waveguides 15, 19 each comprise a first refractive region 15a, 19a through which radiation 20 may propagate, and a second refractive region 15b, 19b that reflects radiation from the interface between the first and second refractive regions 15a, 15b. The refractive index of the first region 15a, 19a must be less than that of the second region 15b, 19b to ensure total internal reflection of the radiation 20 and hence transmission from radiation source 12 to analyte region 16. Both the first and second refractive regions 19a, 19b may comprise a glass selected from one or more of: silica, fluorozirconate, fluoroaluminate, chalcogenide, aluminosilicate, germanosilicate, phosphosilicate, and borosilicate glasses. If the second refractive region 15b, 19b comprises a glass, then it may be doped with a second dopant to raise the refractive index, selected from one or more of germanium dioxide and aluminium oxide. If the first refractive region 15a, 19a comprises a glass, then it may be doped with a first dopant, to lower its refractive index, selected from one or more of fluorine one and boron trioxide. In an alternative embodiment the waveguide may comprise a polymer selected from one or more of: PMMA, an acrylate, an acrylic, a polystyrene, a siloxane, a polycarbonate, methylpentene, a terpolymer of acetonitrile, a butadiene, a styrene, and an allyl diglycol carbonate. If the second region 15b, 19b comprises a polymer, then the first refractive region 15a, 19a may comprise a fluorinated polymer to lower its refractive index relative to the second region 15b, 19b.

Figure 2D:
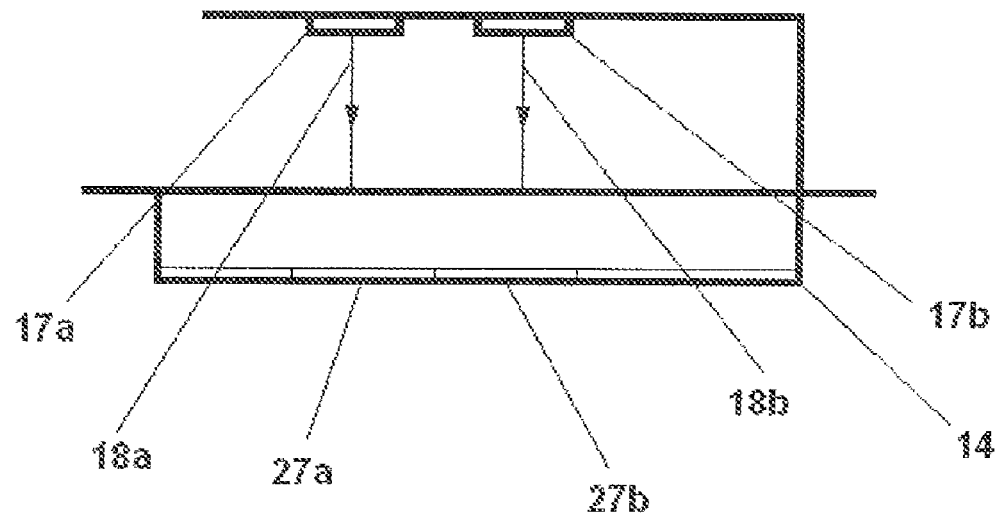
FIG. 2d schematically illustrates a component of apparatus according to one aspect of the invention.

A further embodiment is described in relation to FIG. 2d. As schematically illustrated in FIG. 2d, the apparatus 11a comprises a first grating 17a, and a second grating 17b, the dispersion element comprising the first and second gratings 17a, 17b, each grating 17a, 17b configured to diffract a wavelength, substantially perpendicularly from the grating 17a, 17b. Such perpendicular diffracton occurring when $nk_0 = k_g$; and $\lambda_g = \lambda_0/n$, where n is the refractive index of the second waveguide, $k_0$ and $\lambda_0$ are wavevector and wavelength of the radiation 20a, 20b, and $k_g$ and $\lambda_g$ are the Bragg vector and period of the gratings 17a, 17b respectively. As schematically illustrated in FIG. 2d, the camera 14 has two sensors 27a, 27b, each corresponding to one of the two gratings 17a, 17b, the gratings 17a, 17b and the camera 14 being configured such that each sensor 17a, 17b corresponds to the wavelength 18a, 18b diffracted by the gratings 17a, 17b, each sensor 17a, 17b receiving diffracted radiation only from the grating with which it corresponds. Each grating 17a, 17b may have a period between 400-1000 nm. The grating may have a periodic topological surface profile, a profile depth being between 20 nm and 1000 nm. The topological profile may be sinusoidal, or triangular. If the waveguide 15, 19 comprises glass, then the topological profile may be written into a sacrificial resist layer coated on the glass by one or more of: photolithography, imprint lithography, e-beam lithography, and holography; followed by etching into the glass by: reactive ion etching, or atom etching. if the waveguide 15, 19 comprises a thermosetting polymer, the topological profile may be fabricated by injection moulding, or thermal imprint lithography.

Figure 2E:
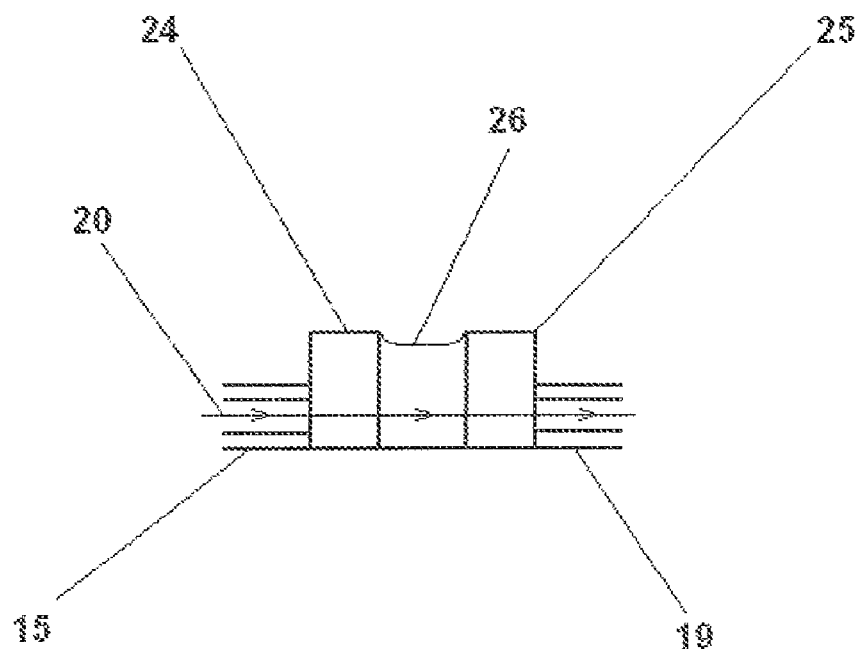
FIG. 2e schematically illustrates a component of apparatus according to one aspect of the invention.

The analyte region 16 is configured to receive an analyte 26, as illustrated in FIG. 2e. The analyte region 16 may comprise a surface onto, or above, which the analyte 26 may be placed. In certain embodiments, the analyte region may be configured to contain a gas/liquid. The analyte may comprise one or more of: a chemical, a biological sample, a food sample, an aqueous solution, a medical sample, a pharmaceutical product, a soil sample, and an agricultural sample. The analyte 26 may comprise a human body part such as a finger that is placed on or in the analyte region. It will be appreciated that at least a portion of the analyte region 16 is optically transparent to receive radiation from the first waveguide 15 and provide it to the second waveguide 19, and as such, such portions can be made from any suitable material, e.g. perspex or glass.

It will be appreciated that, in certain cases, an apparatus according to the present disclosure can be considered to be the spectrometry module 11b alone. In other embodiments, the apparatus could be considered to comprise the portable electronic device and the module 11b. The camera may record variation of the spectrum with time using a video clip. The radiation source 12 may comprise a camera flash. The radiation source 12 may comprise a white flash, or a colour changing LED that varies the wavelength of the radiation, transmitted to the analyte, with time. Such light would be suitable both for illumination of a scene as well as spectometry. The communication device 13 may further comprise a touchscreen 31. The communication device 13 may comprise an antenna, transceiver, microphone and loudspeaker.

Without in any way limiting the scope, interpretation, or application of the claims appearing below, a technical effect of one or more of the example embodiments is that the apparatus and assembly described herein are simple, compact, and robust.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
a waveguide:
a spectral dispersion element;
wherein the apparatus is configured to be moveably attachable to a portable radio communication device comprising a transmitter and a receiver, the portable radio communication device comprising a radiation sensing element and a radiation source, the apparatus being configured to be moveably attachable to the portable radio communication device to provide a first configuration in which the waveguide is positioned to transmit radiation from the radiation source towards an analyte region and/or from the analyte region towards the dispersion element, wherein the dispersion element comprises a plurality of diffraction gratings, each grating being configured to diffract radiation from the analyte region towards the radiation sensing element; and such that the dispersion element is positioned to disperse radiation from the analyte region to form a spectrum which is provided towards the radiation sensing element for spectral analysis, and a second configuration in which the radiation sensing element and radiation source are able to capture and illuminate a scene for image capture.

2. An apparatus according to claim 1, wherein the waveguide is configured to transmit radiation from the analyte region to the dispersion element, and wherein the waveguide is configured such that the dispersion element comprises a diffraction grating formed in the waveguide, the first diffraction grating being configured to diffract radiation from the analyte region towards the radiation sensing element.

3. An apparatus according to claim 2, wherein the grating and the waveguide are each configured such that $nk_0=k_g$; and $\lambda_g=\lambda_0/n$, where n=refractive index of the waveguide, $k_0$=wavevector of the radiation and $\lambda_0$=wavelength of the radiation, $k_g$=Bragg vector of the grating, $\lambda_g$=period of the grating.

4. An apparatus according to claim 1, wherein the apparatus comprises the analyte region; and the analyte region is configured to contain an analyte or is configured to comprise a surface onto which the analyte is placed.

5. An apparatus according to claim 1, wherein the apparatus is configured to be moveably attachable to a device such that the apparatus is moveable between the first configuration and the second configuration in which the apparatus is optically separate from the light sensing element.

6. An apparatus according to claim 1, wherein the apparatus is configured to be moveably attachable to a portable device such that the apparatus is moveable between the first configuration and the second configuration in which the apparatus is separate from the portable device.

7. An apparatus according to claim 1, wherein the apparatus is attached to the portable device and the radiation source comprises a camera flash.

8. An apparatus according to claim 1, wherein the apparatus is a module for a portable device.

9. A method comprising:
(i) providing a first configuration in which an apparatus, comprising a waveguide and a spectral dispersion element, is attached to a portable radio communication device comprising a transmitter and a receiver, which comprises a radiation source and a radiation sensing element; such that the waveguide is positioned to transmit radiation from the radiation source towards an analyte region and/or from the analyte region towards the dispersion element, wherein the dispersion element comprises a number of diffraction gratings, each grating being configured to diffract radiation from the analyte region towards the radiation sensing element; and such that the dispersion element is positioned to disperse radiation from the analyte region to form a spectrum which is provided towards the radiation sensing element for spectral analysis;
(ii) transmitting radiation from the radiation source to the dispersion element via the analyte region to provide a spectrum for spectral analysis; and
(iii) using the radiation sensing element to detect at least part of the spectrum.

10. A method according to claim 9, wherein the method comprises moving the apparatus from the first configuration to a second configuration in which the radiation sensing element and radiation source are able to capture and illuminate a scene for image capture.

11. A method according to claim 9, wherein the sensing element comprises a camera, and wherein the method comprises using the camera to record variation of the spectrum with time.

12. A method according to claim 9, wherein the portable device comprises a radio communication device.

* * * * *